United States Patent [19]
Devismes

[11] Patent Number: 5,146,658
[45] Date of Patent: Sep. 15, 1992

[54] TRIM FASTENER

[75] Inventor: Didier Devismes, Levallois Perret, France

[73] Assignee: Itw De France, Beauchamp, France

[21] Appl. No.: 552,672

[22] Filed: Jul. 16, 1990

[30] Foreign Application Priority Data

Jul. 17, 1989 [FR] France ........................ 89 09591

[51] Int. Cl.$^5$ ............................................. A44B 21/00
[52] U.S. Cl. ........................................ 24/292; 24/297
[58] Field of Search ................. 24/289, 291, 292, 297; 52/718.1

[56] References Cited

U.S. PATENT DOCUMENTS

| | | | |
|---|---|---|---|
| 2,947,048 | 8/1960 | Ellis | 24/291 |
| 3,475,794 | 11/1969 | Seckerson | 24/297 |
| 3,863,300 | 2/1975 | Becker | 24/291 |
| 4,125,917 | 11/1978 | Andre | 24/297 |
| 4,216,637 | 8/1980 | Kraus | 24/297 |
| 4,342,139 | 8/1982 | Tanaka | 24/297 X |

FOREIGN PATENT DOCUMENTS

| | | |
|---|---|---|
| 2804022 | 8/1979 | Fed. Rep. of Germany . |
| 1416572 | 9/1965 | France .................. 24/297 |
| 1506586 | 12/1967 | France . |
| 2260678 | 9/1975 | France . |
| 2542829 | 9/1984 | France . |

1166208 10/1969 United Kingdom ................. 24/297

*Primary Examiner*—James R. Brittain
*Attorney, Agent, or Firm*—Schwartz & Weinrieb

[57] ABSTRACT

A fastener comprises at least one spring tab for snap-fastening an object to the fastener. The spring tab has an inclined surface extending between a first end and a second end, opposite the first end, at which it has a retaining surface set back beneath the inclined surface. The object to be retained has a projecting portion adapted to bear upon the inclined surface of the spring tab when the object is pressed against the fastener. Snap fastening is achieved by pressing the object to be retained onto the fastener in the direction extending from the first end towards the second end. The spring tab deflects and the projecting portion of the object to be retained slides upon the inclined surface of the tab. When the second end of the inclined surface is passed, the spring tab returns toward its original undeflected position and the retaining surface overflies the projecting portion of the object to be retained. The first end of the spring tab is a free end and has a bearing surface, the tab being joined to the body of the fastener by means of a side disposed transverse to the first and second ends. The fastener body comprises a surface overlying the bearing surface of each tab when the object to be retained is snap fastened to the tab.

12 Claims, 1 Drawing Sheet

TRIM FASTENER

BACKGROUND OF THE INVENTION

1. Field of the Invention

The present invention relates generally to fasteners or fastening devices, and more particularly to a fastener comprising at least one spring tab for snap-fastening the fastener to an object to be retained thereby.

2. Description of the Prior Art

In a known fastener of the aforenoted kind the spring tab has an inclined surface defined between a first end at which it merges with the body of the fastener and a second end, disposed opposite the first end, at which it has a retaining surface set back beneath the inclined surface, the object to be retained having a projecting portion adapted to bear upon the inclined surface of the spring tab when the object is pressed against the fastener. The snap fastening operation is achieved by pressing the object to be retained onto the fastener in the direction extending from the first end towards the second end, the spring tab thereby deflecting and the projecting portion of the object to be retained sliding upon the inclined surface of the spring tab, and when the second end of the inclined surface is passed, the spring tab returns to its original undeflected position and the retaining surface overlies the projecting portion of the object to be retained. The latter is then secured to the fastener. If a force is applied which tends to separate the object from the fastener or to move them apart, the projecting portion of the object to be retained cannot move beyond the retaining surface of the spring tab.

These fasteners are usually entirely satisfactory but it is possible for the object to be retained to be inadvertently or undesirably separated from the fastener.

OBJECT OF THE INVENTION

The object of the present invention is therefore directed toward alleviating the aforenoted disadvantage.

SUMMARY OF THE INVENTION

The foregoing and other objectives are achieved in accordance with the present invention which consists of a fastener comprising at least one spring tab for snap-fastening, to the fastener, an object to be retained thereby, the spring tab having an inclined surface defined between a first end which is disposed and a second end, opposite the first end, at which it has a retaining surface set back beneath the inclined surface, the object to be retained having a projecting portion adapted to bear upon the inclined surface of the spring tab when the object is pressed against the fastener, the snap fastening operation being achieved by pressing the object to be retained onto the fastener in the direction extending from the first end towards the second end, the spring tab deflecting and the projecting portion of the object to be retained sliding upon the inclined surface of the spring tab, and when the second end of the inclined surface is passed, the spring tab returns to its original undeflected position and the retaining surface of the spring tab overlies the projecting portion of the object to be retained. In accordance with this fastener the first end of the spring tab is a free end and has a bearing surface, the tab being joined to the body of the fastener by means of a side disposed transverse to the first and second ends, and the body of the fastener comprises a surface overlying the bearing surface of the spring tab when the object to be retained is snap fastened to the tab.

If a force is applied to the fastener assembly which tends to separate the object to be retained and the fastener apart to the degree that the spring tab is deformed, the bearing surface of the spring tab bears against the surface of the body of the fastener which overlies it. Instead of the tab being able to rise or twist (or in other words pivot upon itself) as is true in connection with known fasteners, until the object to be retained is able to become detached, the deformation of the spring tab is limited or prevented before there is any risk whatsoever of such detachment, by means of the tab coming into abutting relationship with the body of the fastener.

Apart from the advantages resulting from the secure fastening operation or mode achieved by means of the present invention, it will be observed that the present invention is particularly simple and convenient to implement as it is only the fastener which needs to be modified and the modifications to be made to it are not difficult to implement.

The position assumed by means of the spring tab when the object to be retained is snap-fastened to it can correspond to that which is assumed spontaneously, but in accordance with a preferred characteristic of the present invention the fastener is adapted to cooperate with the object to be retained so that in the snap-fastened position the spring tab is held in tension by means of the object to be retained against which it bears through means of an abutment surface disposed transverse to the retaining surface.

Holding the spring tab in tension has the advantage of securing the object to be retained to the fastener without play.

BRIEF DESCRIPTION OF THE DRAWINGS

The description of one embodiment of the present invention as will be given hereinafter by means of a non-limiting example and with reference to the appended drawings will exhibit or demonstrate the characteristics and advantages of the invention, wherein the drawings contain reference characters designating like or corresponding parts throughout the several views, and wherein.

DETAILED DESCRIPTION OF THE INVENTION

Figure 1:
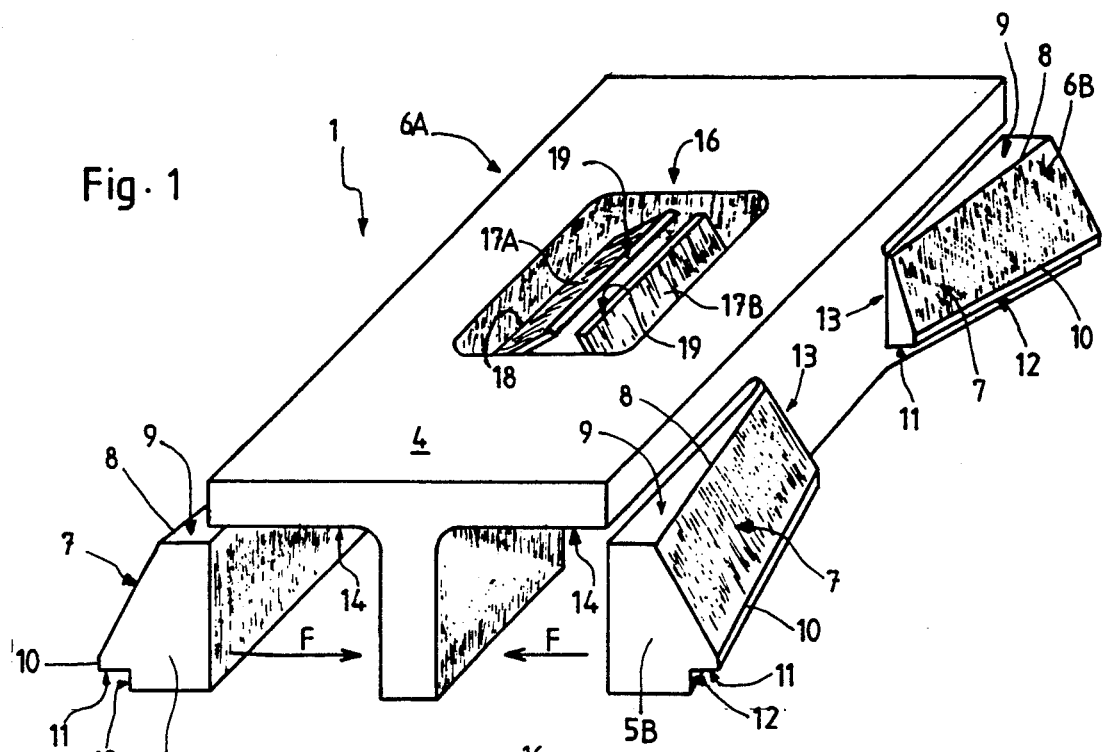
FIG. 1 is a perspective view of a fastener constructed in accordance with the present invention.

The fastener 1 as shown in FIG. 1 is molded from thermoplastic materials. It is designed to serve as an intermediary member interposed between a support 2 such as, for example, a part of an automobile body and an object 3 to be retained thereon and thereby, such as, for example a side strip of molding trim or other embellishment.

The fastener 1 comprises a body 4 and two pairs of similar spring tabs 5A, 5B and 6A, 6B. The tabs 5A and 5B which form a first pair are disposed upon opposite sides of a longitudinal plane of symmetry, as are the tabs 6A and 6B which form a second pair, the first and second pairs also being disposed upon opposite sides of a transverse plane of symmetry.

Each spring tab has an inclined surface 7 extending between a first free end 8 at which is defined a bearing surface 9 and a second free end 10 disposed opposite the first end at which is defined a retaining surface 11 set back beneath the surface 7 and an abutment surface 12 transverse to the retaining surface 11. The tab merges with the body 4 at an edge 13 which is disposed transverse to the ends 8 and 10 so that it can pivot or deflect in a direction parallel to the surfaces 9 and 11, as shown by means of the arrow F.

Figure 3:
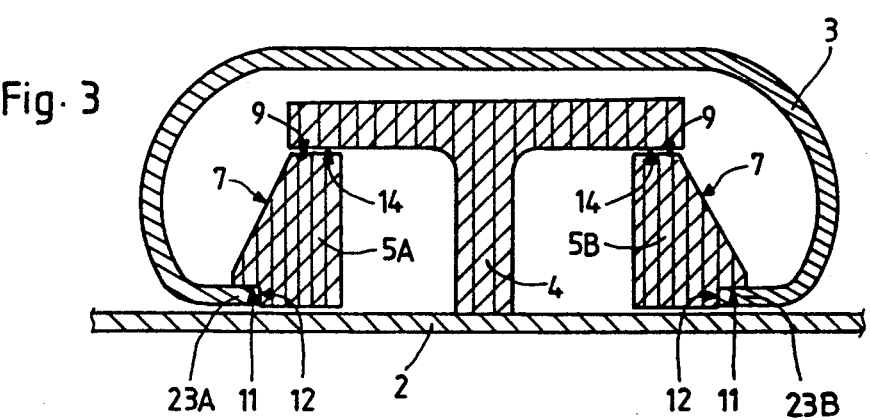
FIG. 3 is a cross-section through the fastener upon a transverse plane passing through the spring tabs which are disposed at the front of the fastener as seen in FIG. 1, the object to be retained being fitted to the fastener.

The body 4 comprises, for each tab, a surface 14 which overlies the bearing surface 9 when the tab has been deflected from its original undeflected position (FIG. 1) to a position at which it is disposed nearer the axial center of the fastener (FIG. 3).

The fastener body also includes a centrally located aperture 16 within which are disposed two similar spring tangs 17A and 17B disposed upon opposite sides of the longitudinal plane of symmetry of the fastener and each merging with the fastener body at an end 18 from which they extend towards each other in inclined planes which intersect towards the top of the fastener, their ends 19 disposed opposite the ends 18 being free ends and forming a bearing surface.

Figure 2:
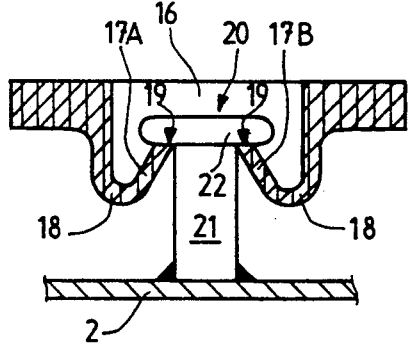
FIG. 2 is cross-section through the fastener of FIG. 1 as taken upon its transverse plane of symmetry, the fastener being fitted to a support with which it is adapted to cooperate.

A stud 20 or the like having an elongate body 21 ending in a flattened portion 22 is fixed to the support 2, in this instance by means of welding, the support 2 and the stud 20 being made of metal, so as to enable the fastener 1 to be fixed to the support 2. The fastener 1 is secured to the support 2 in such a way that the lower surface of each of the spring tangs 17A and 17B initially bears upon the flattened portion or head 22 of the stud 20 and the fastener 1 is then pressed towards the support 2. The tangs 17A and 17B then deflect as a result of the applied force and when their free ends 19 have passed beyond the portion 22 the tangs relax and the surface formed by means of each end 19 bears against the bottom of the head portion 22 of the stud 20, the configuration or assembly then being as shown in FIG. 2 with the fastener 1 fixed to the support 2.

The object 3 to be retained by means of the fastener 1 and upon the support 2 comprises two projecting portions 23A and 23B disposed upon opposite sides of a longitudinal plane of symmetry and respectively adapted to cooperate with the tabs 5A, 6A and 5B, 6B. These projecting portions 23A and 23B bear upon the inclined surfaces 7 of the corresponding tabs when the object to be retained is pressed against the fastener, the snap-fastening operation being achieved by means of pressing the object 3 against the fastener 1 in the direction extending from the end 8 of each tab towards the end 10 of each tab, each of the spring tabs deflecting and the projecting portion 23A and 23B of the object 3 sliding downwardly upon the inclined surfaces 7 of the tabs. When the end 10 of each tab is passed, each of the spring tabs returns toward its undeflected positions and the retaining surface 11 of each tab overlies the corresponding projecting portion of the object 3. The situation is then as shown in FIG. 3 in which the object 3 is secured to the fastener 1, that is, the same is locked in position by means of the tabs 5A, 5B and 6A, 6B.

The bearing surface 9 of each of the tabs 5A, 5B, 6A, 6B is then covered by means of the surface portions 14 of the fastener body so that if a force is applied which is strong enough to separate the object 3 and the fastener 1, the resulting deformation of the tabs will be limited to that which brings the surfaces 9 against the surfaces 14 overlying them, that is, there is very limited deformation, with no risk of enabling detachment of the object 3.

It will be seen that in the snap-fastened position of the fastener assembly, (FIG. 3) the tabs 5A, 5B, 6A, 6B are stressed relative to their spontaneous or originally undeflected position (FIG. 1). More particularly, the tabs are retained at a position at which they are intension by means of the object to be retained, the projecting portions 23A, 23B of which bear against the abutment surfaces 12. In this way the object to be retained is secured to the fastener without play.

In the embodiment that has just been described, the fastener comprises four similar spring tabs. However, according to individual circumstances, two similar opposed spring tabs may be sufficient, and in certain circumstances, even a single tab. It is also possible to provide one or more conventional spring tabs—merging with the body 4 at the first end 8 while the transverse side 13 is free—and one or more tabs like the tabs 5A, 5B, 6A and 6B.

It will also be noted that if the fastener serves as an intermediate member, it may be fixed to the support in many other ways than that described and that the fastener may be used in a mode other than as an intermediate member.

Of course, the invention is not limited to the embodiment described and shown in the figures but to the contrary encompasses any variant thereof that might suggest itself to those skilled in the art.

It is therefore to be understood that within the scope of the appended claims, the present invention may be practiced otherwise than as specifically described herein.

There is claimed:

1. A fastener for securing an object to an underlying support, comprising:
   a fastener body having a longitudinal axis, a predetermined lateral extent defined by means of a pair of laterally spaced sidewalls, and means for securing said fastener to an underlying support; and
   two pairs of spring tabs mounted upon said pair of laterally spaced fastener body sidewalls with one pair of said spring tabs mounted within each one of said pair of laterally spaced fastener body sidewalls wherein each one of said spring tabs is pivotably mounted in a cantilevered manner about a hinge portion defined within a respective one of said fastener body sidewalls and disposed within a plane which is transverse to said longitudinal axis of said fastener body such that said tabs of each one of said pairs of spring tabs mounted within each one of said fastener body sidewalls move, in opposite directions with respect to each other and with respect to said longitudinal axis of said fastener body, between a first laterally outward position with respect to said respective one of said fastener body sidewalls at which each one of said spring tabs engages said object to be secured upon said underlying support, and a second laterally inward position with respect to said respective one of said fastener body sidewalls at which each one of said spring tabs is lockingly engaged with said object such that said object is fixedly secured upon said underlying support through means of said fastener; through means of said fastener;

said fastener body further comprising a surface portion which is separated from said underlying support, so as to define a space therebetween, and extending laterally outwardly with respect to said longitudinal axis of said fastener body such that when said spring tabs are moved from said first laterally outward position to said second laterally inward position, said spring tabs will be disposed within said space and beneath said surface portion of said fastener body such that said surface portion of said fastener body overlies said spring tabs when said spring tabs are disposed at said second laterally inward position.

2. A fastener as set forth in claim 1, wherein:

said surface portion of said fastener body has a laterally outward extent which is equal to said lateral extent of said fastener body as defined by said fastener body sidewalls.

3. A fastener as set forth in claim 1, wherein:

said fastener, including said fastener body portion as defined along said longitudinal axis thereof and said surface portion thereof, has a substantially T-shaped configuration as seen in cross-section.

4. A fastener as set forth in claim 1, wherein:

each one of said spring tabs has an inclined surface, extending between a first end thereof at which there is defined a bearing surface and a second end thereof at which there is defined a retaining surface for receiving a projecting portion of said object, for engaging said projection portion of said object as said object is mounted upon said fastener by pressing said object onto said fastener in the direction extending from said first end of said tab toward said second end of said tab while said tab is disposed at said first laterally outward position whereby as said object is mounted upon said fastener, said projecting portion of said object moves along said inclined surface of said tab so as to cause said tab to move from said first laterally outward position to said second laterally inward position whereupon when said projecting portion of said object clears said inclined surface of said tab and engages said retaining surface of said tab, said tab will be disposed within said space defined between said underlying support and said laterally outwardly extending surface portion of said fastener body such that said bearing surface of said tab will be disposed beneath said laterally outwardly extending surface portion of said fastener body so as to prevent disengagement of said object from said fastener.

5. A fastener according to claim 4, wherein:

said fastener is adapted to cooperate with said object to be retained so that in said engaged position, said spring tab is held in tension by said object to be retained, against which it bears, through means of an abutment surface which is disposed transverse to said retaining surface.

6. A fastener according to claim 1, wherein:

said underlying support comprises an upstanding post secured to said underlying support and having a head portion fixedly provided thereon; and said means for securing said fastener to said underlying support comprises a plurality of spring tangs for securing said fastener to said head portion of said post fixed to said underlying support.

7. A fastener according to claim 6, wherein:

said spring tangs are disposed at a central position of said fastener body as considered along said longitudinal axis and said lateral extent thereof.

8. A fastener as set forth in claim 6, wherein:

said plurality of spring tangs comprises a pair of oppositely disposed, oppositely movable spring tangs integral with said surface portion of said fastener body for engaging a bottom portion of said head portion of said post.

9. A fastener according to claim 1, wherein:

said two pairs of spring tabs comprise a first pair of tabs which are disposed upon opposite sides of a longitudinal plane of symmetry corresponding with said longitudinal axis of said fastener body, and a second pair of tabs disposed upon opposite sides of a transverse plane of symmetry.

10. Fastener according to claim 1 wherein said support is an automobile body and said object to be retained is an embellisher.

11. A fastener as set forth in claim 1, wherein:

said object comprises an elongated strip having a substantially U-shaped configuration as seen in cross-section for enveloping said fastener body and said two pairs of spring tabs thereof.

12. A fastener as set forth in claim 1, wherein:

said fastener comprises a one-piece component molded from a thermoplastic material.

* * * * *